United States Patent [19]

Nakanishi et al.

[11] 3,920,679

[45] Nov. 18, 1975

[54] THIENODIAZEPINE COMPOUNDS

[75] Inventors: Michio Nakanishi, Nakatsu; Tetsuya Tahara, Fukuoka; Kazuhiko Araki, Fukuoka; Masami Shiroki, Fukuoka, all of Japan

[73] Assignee: Yoshitomi Pharmaceutical Industries, Ltd., Osaka, Japan

[22] Filed: June 21, 1973

[21] Appl. No.: 372,354

[30] Foreign Application Priority Data

June 22, 1972 Japan................................ 47-63028
July 3, 1972 Japan................................ 47-66923
July 3, 1972 Japan................................ 47-66924

[52] U.S. Cl. .... 260/309; 260/239.3 T; 260/239.3 B; 260/307 A; 260/308 D; 260/329 F; 260/332.3 P; 260/332.5; 424/269; 424/272; 424/273

[51] Int. Cl.²....................................... C07D 495/14

[58] Field of Search....................... 260/308 D, 309

[56] References Cited
UNITED STATES PATENTS 3,371,085  2/1968  Reeder et al. ............... 260/239.3 D
3,717,653  2/1973  Hester........................... 260/308 D
3,763,179  10/1973  Gall ............................. 260/309

FOREIGN PATENTS OR APPLICATIONS 2,107,356  8/1971  Germany..................... 260/239.3 B

OTHER PUBLICATIONS

Robba et al., Chem. Abstracts, Vol. 69, Abstract No. 96635j (1968).

Robba et al., Chem. Abstracts, Vol. 69, Abstract No. 27365j (1968).

Hester et al., Chem. Abstracts, Vol. 78, Abstract No. 136353K (1973).

*Primary Examiner*—Alton D. Rollins
*Attorney, Agent, or Firm*—Sughrue, Rothwell, Mion, Zinn & Macpeak

[57] ABSTRACT

Thienodiazepine compounds of the formula:

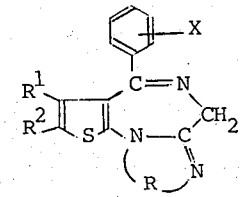

wherein X is a member selected from the group consisting of a hydrogen atom, a halogen atom, a trifluoromethyl group, an alkoxy group having 1 to 4 carbon atoms and an alkyl group having 1 to 4 carbon atoms; each of $R^1$ and $R^2$ is a member selected from the group consisting of a hydrogen atom and an alkyl group having 1 to 4 carbon atoms, or $R^1$ and $R^2$ together form a tetramethylene group, i.e. $-(CH_2)_4-$; and R is a member selected from the group consisting of $-CH=CH-$, $-N=N-$ and $-CO-O-$; and pharmaceutically acceptable acid addition salts thereof are disclosed. They are useful as minor tranquilizers.

3 Claims, No Drawings

THIENODIAZEPINE COMPOUNDS

This invention relates to novel and therapeutically valuable thieno[2,3-e][1,4]diazepine compounds of the formula:

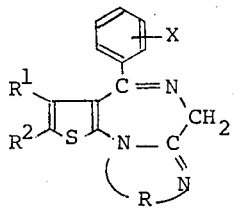

[I]

and pharmaceutically acceptable acid addition salts thereof, wherein X is a member selected from the group consisting of a hydrogen atom, a halogen atom (e.g. F, Cl or Br), a trifluoromethyl group, an alkoxy group having 1 to 4 carbon atoms (e.g. methoxy, ethoxy, propoxy or butoxy) and an alkyl group having 1 to 4 carbon atoms (e.g. methyl, ethyl, propyl or butyl); each of $R^1$ and $R^2$ is a member selected from the group consisting of a hydrogen atom and an alkyl group having 1 to 4 carbon atoms (e.g. methyl, ethyl, propyl or butyl), or $R^1$ and $R^2$ together form a tetramethylene group, i.e. —(CH$_2$)$_4$—; and R is a member selected from the group consisting of —CH=CH—, —N=N— and —CO—O—.

Compounds of the formula:

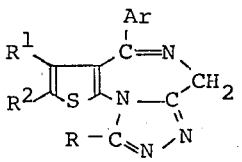

wherein Ar is a member selected from the group consisting of an optionally substituted phenyl group and a pyridyl group; each of $R^1$ and $R^2$ is a member selected from the group consisting of a hydrogen atom and an alkyl group having 1 to 4 carbon atoms, or $R^1$ and $R^2$ together form a tetramethylene group i.e. —(CH$_2$)$_4$—; and R is a member selected from the group consisting of a hydrogen atom, an alkyl group having 1 to 4 carbon atoms and an optionally substituted phenyl group, are disclosed in U.S. Pat. Application Ser. No. 261757 as having utility as minor tranquilizers. They have a fairly strong ataxia-inducing action which may cause adverse effects such as lassitude, dizziness and disturbance in walking. Conventional minor tranquilizers, for example diazepam, mostly show a considerably strong ataxia-inducing action, too. On the contrary, the compounds of present invention are far less potent in the said action than the prior art compounds.

The Compounds of formula [I] can be produced by the following methods (i) to (iii). i. In the case of compounds of formula [I] wherein R is —CH=CH—; by subjecting a compound of the formula:

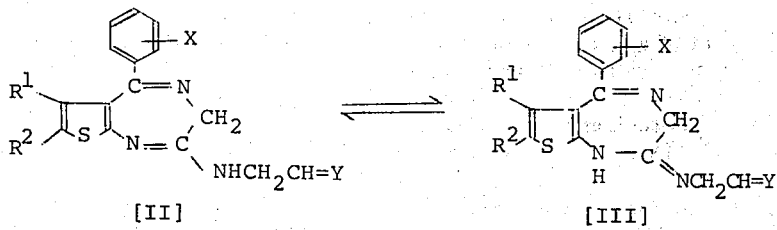

wherein X, $R^1$ and $R^2$ are as defined above, and Y is O or (OR$^3$)$_2$ [wherein $R^3$ is an alkyl group having 1 to 4 carbon atoms (e.g. methyl, ethyl, propyl or butyl) or an aralkyl group (e.g. benzyl)], to intramolecular condensation.

The reaction is usually carried out in an inert solvent (e.g. methanol, ethanol, dioxane, dimethylformamide, tetrahydrofuran or benzene, or a mixture thereof) at a temperature of from room temperature to about 150°C for a period of from an hour to several hours, advantageously in the presence of an acid catalyst (e.g. hydrochloric acid, sulfuric acid, polyphosphoric acid, formic acid, acetic acid, propionic acid, methanesulfonic acid or p-toluenesulfonic acid) under reflux. The reaction can also be carried out without a solvent. In such a case, the starting compound of formula [II] is preferably fused at a temperature somewhat higher than its melting point, usually at a temperature between about 150°C and about 220°C.

Tautomerism is encountered in the compounds of formula [II]:

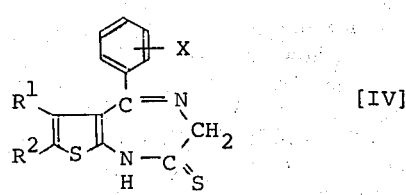

wherein X, $R^1$, $R^2$ and Y are as defined above. In this specification, however, these compounds are named as the compounds of formula [II].

The starting compounds of formula [II] wherein Y is (OR$^3$)$_2$ can be produced by reacting a compound of the formula:

[IV]

wherein X, $R^1$ and $R^2$ are as defined above, with an aminoacetal of the formula:

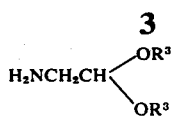  [V]

wherein $R^3$ is as defined above, in an inert solvent, advantageously under heating.

The compound of formula [II] wherein Y is 0 can be obtained by hydrolysis of the compound of formula [II] wherein Y is $(OR^3)_2$. ii. In the case of compounds of formula [I] wherein R is —N=N—; by reacting a compound of formula:

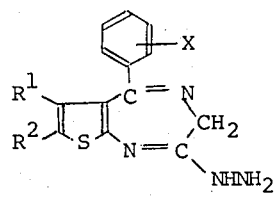  [VI]

wherein X, $R^1$ and $R^2$ are as defined above, with nitrous acid.

More particularly, the compound of formula [VI] is allowed to react with an aqueous solution of an alkali metal salt of nitrous acid (e.g. sodium nitrite or potassium nitrite).

The reaction is usually carried out in an aqueous solution below 50°C for a period of from a few minutes to several hours. The reaction is forced to completion by treatment of a suitable alkali (e.g. sodium carbonate, potassium carbonate, sodium hydroxide or potassium hydroxide).

Tautomerism is encountered again in the compounds of formula [VI]:

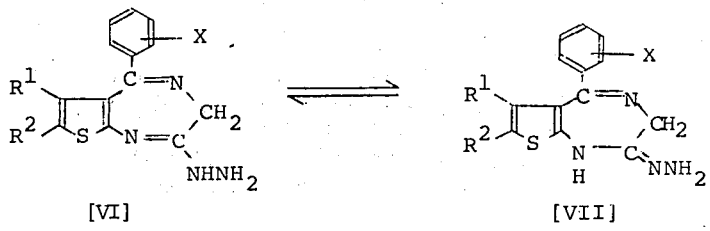

wherein X, $R^1$ and $R^2$ are as defined above. In this specification, however, these compounds are named as 2-hydrazino compounds of formula [VI].

The starting compounds of formula [VI] can be prepared, for example, by the method disclosed in Published West German Pat. Application OLS-2229845, namely by reacting the compound of formula [IV] with hydrazine. iii. In the case of compounds of formula [I] wherein R is —CO—O—; by reacting a compound of the formula:

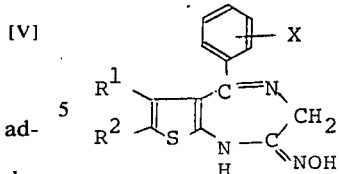  [VIII]

wherein X, $R^1$ and $R^2$ are as defined above, with phosgene.

The reaction is usually carried out in an inert solvent (e.g. benzene, toluene, xylene, chloroform, methylene chloride, diethyl ether, tetrahydrofuran or dioxane) at a temperature of from room temperature to a refluxing temperature, if necessary, in the presence of a deacidifying agent such as triethylamine or pyridine.

Tautomerism is once more encountered in the compounds of formula [VIII]:

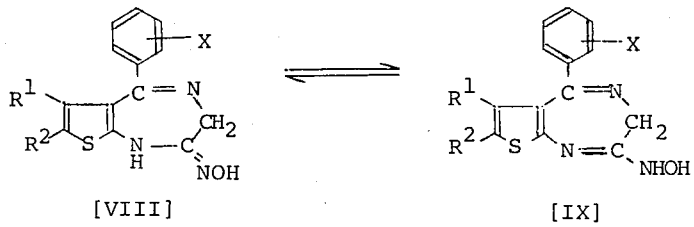

wherein, X, $R^1$ and $R^2$ are as defined above. In this specification, however, these compounds are named as 2-hydroxyimino compounds of formula [VIII].

The starting compounds of formula [VIII] can be prepared, for example, by reacting the compound of formula [IV] with hydroxylamine.

The compounds of formula [I] can be converted into the corresponding acid addition salts in a conventional manner by treating the compounds with various inorganic and organic acids, for example, hydrochloric, sulfuric, hydrobromic, phosphoric, nitric, methanesulfonic, p-toluenesulfonic, acetic, oxalic, maleic, fumaric, citric and camphorsulfonic acids.

The compounds of formula [I] and pharmaceutically acceptable acid addition salts thereof are strong in suppression of fighting behavior and anticonvulsant effect, but very weak in ataxia-inducing action as shown, for example, by the following tests.

I. Suppression of Fighting Behavior

Fighting episodes were produced in mice by the method described by Tedeschi et al. in the Journal of Pharmacology and Experimental Therapeutics, vol. 125, p. 28 ff. (1959). Groups of 8 female mice (4 pairs) were given the test compound orally 60 minutes prior to receiving an electric foot-shock for 3 minutes with a 530 volt interrupted direct current, 1.3 milliampereas, 10 cycles per second. The exhibition of 3 fighting episodes or less within the 3 minute electric foot shock treatment was deemed to be a suppression of the fighting behavior by the test compound. 81 pairs of control mice had shown an 8.7 fighting episode average under the same conditions without administration of the test compound. The $ED_{50}$, the dose required to suppress 50% of fighting pairs was determined graphically.

II. Anticonvulsant Effect

Pentylenetetrazole (150 mg/kg) was administered subcutaneously to groups consisting of 6 mice 15 minutes after the intraperitoneal administration of the test compound. The number of dead mice was counted 3 hours after the administration of pentylenetetrazole, and then the $ED_{50}$, the dose required to suppress the motality rate to 50%, was determined graphically.

III. Ataxia-Inducing Action (Rotating-Cage Method)

Groups of 10 female mice each were placed on the horizontal metal wire mesh cage (25 cm diameter, 8 mm wire mesh) rotating at a speed of 13 r.p.m. The number of mice which had dropped from the cage within 1 minute was determined. The tests were performed 1 hour after the intraperitoneal administration of the test compounds. The $ED_{50}$, the dose required to cause 50% of the animals to fall off the cage, was determined graphically.

Results

| Compound | Suppression of Fighting Behavior, $ED_{50}$ mg/kg |
|---|---|
| A | 0.6 |
| DZP | 1.6 |
| Compound | Anticonvulsant Effect, $ED_{50}$ mg/kg |
| A | 0.1 |
| DZP | 0.9 |
| Compound | Ataxia-Inducing Action, $ED_{50}$ mg/kg |
| A | >80 |
| DZP | 7.2 |

Compounds A and DZP are identified below:
A: 6-o-chlorophenyl-8-ethyl-4H-imidazo[2,1-c]thieno[2,3-e][1,4]diazepine DZP: Diazepam In view of the tests above, the compounds of formula [I] and pharmaceutically acceptable acid addition salts thereof are more potent in suppression of fighting behavior and anticonvulsant effect, and less potent in ataxia-inducing action than Diazepam which is representative one of conventional minor tranquilizers. Seeing this in clinical respect, it can be said that the compounds of formula [I] and pharmaceutically acceptable acid addition salts thereof have less side effects such as lassitude, dizziness or disturbance in walking than the conventional tranquilizers, which side effects are caused by the said ataxia-inducing action.

In view of various tests, including those mentioned above, the compounds of the invention represented by formula [I] and pharmaceutically acceptable acid addition salts thereof can be safely administered orally as minor tranquilizers (antianxiety drugs) for the treatment of neurosis, anxiety, tension and depressive states, in the form of a pharmaceutical preparation with a suitable and conventional pharmaceutically acceptable carrier or adjuvant, without adversely affecting the patients.

The pharmaceutical preparations can take any conventional form such as tablets, capsules or powders.

Formulation Examples (a) Tablets each containing 1 mg of an active ingredient are prepared from the following compositions:

| | Compound [I] | 1 mg |
|---|---|---|
| | Lactose | 30 |
| | Microcrystalline Cellulose | 53 |
| | Corn Starch | 17 |
| | Talc | 9 |
| | | 110 mg |
| (b) | An 1% powder is prepared from the following compositions: | |
| | Compound [I] | 1% by weight |
| | Lactose | 97 |
| | Methyl Cellulose | 1 |
| | Silicon Dioxide | 1 |
| | | 100% |

The daily dose of compound [I] or a salt thereof for human adults usually ranges from about 2 to 24 mg. in single or multiple dose, but it may vary depending upon the age, body weight, and/or severity of the conditions to be treated as well as the response to the medication.

The present invention will be better understood from the following examples, but they are not to be construed as limiting the present invention.

EXAMPLE 1

A solution of 7.0 g of 5-o-chlorophenyl-2-(2,2-diethoxyethylamino)-3H-thieno[2,3-e][1,4]diazepine in 60 ml of glacial acetic acid is refluxed moderately for 2 hours. After cooling, the acetic acid is distilled off under reduced pressure. The residue obtained is alkalified with an aqueous sodium carbonate solution, and the solution is extracted with ethyl acetate. The extract is washed with water, dried over sodium sulfate, and concentrated under reduced pressure. To the viscous oil obtained is added a mixture of ligroin and ethyl acetate (9:1), and the precipitated crystals are collected by suction filtration. The crystals (5.1g) are recrystallized from a mixture of ligroin and ethyl acetate (9:1) to give 6-o-chlorophenyl-8-ethyl-4H-imidazo[2,1-c]thieno[2,3-e][1,4]-diazepine as colorless plates melting at 124°–127°C. This product is treated with alcoholic hydrochloric acid, and the corresponding hydrochloride as colorless crystalline powder shows a melting point of 243°–245°C (from acetone).

EXAMPLE 2

2.5 g of 2-(2,2-diethoxyethylamino)-7-ethyl-5-phenyl-3H-thieno[2,3-e][1,4]diazepine is heated at 150°C on an oil bath for 15 minutes. After cooling, the resultant is dissolved in ethyl acetate. The solution is filtered with activated charcoal, and the filtrate is concentrated. Ligroin is added to the residue, and the precipitated crystals are collected by suction filtration. The crystals are recrystallized from ligroin to give 1.5 g of 8-ethyl-6-phenyl-4H-imidazo[2,1-c]-thieno[2,3-e][1,4]diazepine as colorless needles melting at 96°–98°C.

EXAMPLE 3

To a mixture of 4.2 g of 2-(2,2-diethoxyethylamino)-5-phenyl-6,7,8,9-tetrahydro-3H-[1]benzothieno[2,3-e][1,4]diazepine and 50 ml of ethanol is added 5 drops of concentrated sulfuric acid, and the mixture is refluxed for 2 hours. The solvent is distilled off under reduced pressure. The residue is alkalified with a 10% sodium carbonate solution, and the solution is extracted with ethyl acetate. The extract is washed with water, dried over sodium sulfate, and concentrated uner reduced pressure. The crystalline residue obtained is recrystallized from a mixture of ligroin and ethyl acetate (1:1) to give 2.5 g of 6-phenyl-7,8,9,10-tetrahydro-4H- imidazo[2,1-c][1]benzothieno[2,3-e][1,4]diazepine as colorless fine needles, melting at 167°–169°C.

EXAMPLE 4

10 g of 5-o-chlorophenyl-7-ethyl-2-hydrazino-3H-thieno-[2,3-e][1,4]diazepine is suspended in 54 ml of 2 N hydrochloric acid. A solution of 2.4 g of sodium nitrite in 20 ml of water is added to the suspension at −5°C with stirring. The mixture is stirred at room temperature for 30 minutes, and then alkalified with sodium carbonate. The precipitated crystals are filtered off and dissolved in chloroform, and the solution is washed with water. The chloroform layer is dried over anhydrous magnesium sulfate, and the chloroform is distilled off under reduced pressure. The reddish brown jelly-like residue thus obtained is crystallized from a mixture of ligroin and ethanol to give 8.2 g of 6-o-chlorophenyl-8-ethyl-4H-tetrazolo[5,1-c]thieno[2,3-e][1,4]diazepine as white crystals. The product, when recrystallized from ethanol, melts at 135°–136°C.

EXAMPLE 5

10 g of 5-o-chlorophenyl-2-hydrazino-7-methyl-3H-thieno[2,3-e][1,4]diazepine is suspended in 54 ml of 2 N hydrochloric acid. A solution of 2.26 g of sodium nitrite in 20 ml of water is added to the suspension at −5°C with stirring. The mixture is stirred at room temperature for 1 hour, and alkalified with sodium carbonate. The precipitated crystals thus obtained are treated in the same manner as in Example 4 to give 7.9 g of 6-o-chlorophenyl-8-methyl-4H-tetrazolo-[5,1-c]thieno[2,3-e][1,4]diazepine as white crystals. This product, when recrystallized from ethanol, melts at 122°–123°C.

EXAMPLE 6

A solution of 10 g of 5-o-chlorophenyl-7-ethyl-2-hydroxyimino-1,2-dihydro-3H-thieno[2,3-e][1,4]diazepine and 7 g of triethylamine in 50 ml of toluene is added dropwise to 150 ml of 20% phosgene solution in toluene at 15°–20°C with stirring. The mixture is stirred at room temperature for 4 hours, and then at 50°–60°C with introduction of nitrogen gas to remove the excess phosgene. After cooling the reaction mixture, the precipitated triethylamine hydrochloride is removed by suction filtration, and the filtrate is concentrated under reduced pressure. The pale red jelly-like residue obtained is crystallized from a mixture of ligoin and ethanol to give 7.5 g of 6-o-chlorophenyl-8-ethyl-1H,4H-[1,2,4]oxadiazolo[3,4-c]-thieno[2,3-e][1,4]diazepin-1-one as pale yellow crystals. This product, when recrystallized from ethanol, melts at 132°–133°C.

EXAMPLE 7

A solution of 12.7 g of 5-o-chlorophenyl-2-hydroxyimino-7-methyl-1,2-dihydro-3H-thieno[2,3-e][1,4]diazepine and 10 g of triethylamine in 50 ml of toluene is added dropwise to 150 ml of 20% phosgene solution in toluene at 20°C with stirring. The mixture is stirred at room temperature for 3.5 hours, and the reaction mixture is treated in the same manner as in Example 6 to give 9.6 g of 6-o-chlorophenyl-8-methyl-1H,4H-[1,2,4]oxadiazolo[3,4-c]thieno[2,3-e][1,4]diazepin-1-one as pale yellow crystals. This product, when recrystallized from a mixture of ethanol and chloroform, melts at 154°–156°C.

Using the procedure set forth in the above examples, but substituting equivalent amounts of the appropriate starting compounds, the following compounds are also produced:

(1) 6-phenyl-4H-imidazo[2,1-c]thieno[2,3-e][1,4]diazepine, melting at 156°–157°C;
(2) 6-o-chlorophenyl-8-methyl-4H-imidazo[2,1-c]thieno-[2,3-e][1,4]diazepine hydrochloride, melting at 252°–253°C with decomposition;
(3) 6-o-chlorophenyl-8-ethyl-4H-imidazo[2,1-c]thieno[2,3-e]-[1,4]diazepine, melting at 180°–182°C;
(4) 6-o-bromophenyl-8-ethyl-4H-imidazo[2,1-c]thieno[2,3-e]-[1,4]diazepine hydrochloride, melting at 237°–238°C;
(5) 8-ethyl-6-o-fluorophenyl-4H-imidazo[2,1-c]thieno[2,3-e]-[1,4]diazepine mono hydrate, melting at 95°–96°C;
(6) 8-ethyl-6-p-fluorophenyl-4H-imidazo[2,1-c]thieno[2,3-e]-[1,4]diazepine, melting at 116°–117°C;
(7) 8-ethyl-6-m-trifluoromethylphenyl-4H-imidazo[2,1-c]-thieno[2,3-e][1,4]diazepine;
(8) 8-ethyl-6-o-tolyl-4H-imidazo[2,1-c]thieno[2,3-e][1,4[-diazepine;
(9) 8-ethyl-6-o-methoxyphenyl-4H-imidazo[2,1-c]thieno-[2,3-e][1,4]diazepine dihydrochloride, melting at 215°–216°C with decomposition;
(10) 8-ethyl-6-p-methoxyphenyl-4H-imidazo[2,1-c]thieno-[2,3-e][1,4]diazepine, melting at 173°–175°C;
(11) 6-o-chlorophenyl-7,8-dimethyl-4H-imidazo[2,1-c]thieno-[2,3-e][1,4]diazepine, melting at 131°–132°C;
(12) 6-o-chlorophenyl-7,8,9,10-tetrahydro-4H-imidazo[2,1-c]-[1]benzothieno[2,3-e][1,4]diazepine dihydrochloride, melting at 249°–251°C with decomposition;
(13) 6-o-chlorophenyl-7,8-dimethyl-4H-tetrazolo[5,1-c]thieno-[2,3-e][1,4]diazepine, melting at 149°–150°C;
(14) 8-ethyl-6-phenyl-4H-tetrazolo[5,1-c]thieno[2,3-e][1,4]-diazepine;
(15) 8-ethyl-6-o-tolyl-4H-tetrazolo[5,1-c]thieno[2,3-e][1,4]-diazepine;
(16) 8-ethyl-6-o-methoxyphenyl-4H-tetrazolo[5,1-c]thieno-[2,3-e][1,4]diazepine;
(17) 8-ethyl-6-o-trifluoromethylphenyl-4H-tetrazolo[5,1-c]-thieno[2,3-e][1,4]diazepine;
(18) 6-phenyl-7,8,9,10-tetrahydro-4H-tetrazolo[5,1-c][1]-benzothieno[2,3-e][1,4]diazepine, melting at 171°–172°C;
(19) 8-ethyl-6-phenyl-1H,4H-[1,2,4]oxadiazolo[3,4-c]thieno-[2,3-e][1,4]diazepin-1-one hydrochloride, melting at 191°–192°C with decomposition;
(20) 6-o-chlorophenyl-7,8-dimethyl-1H,4H-[1,2,4]oxadiazolo-[3,4-c]thieno[2,3-e][1,4]diazepin-1-one, melting at 136°–138°C;
(21) 8-ethyl-6-o-tolyl-1H,4H-[1,2,4]oxadiazolo[3,4-c]thieno-[2,3-e][1,4]diazepin-1-one;
(22) 8-ethyl-6-o-methoxyphenyl-1H,4H-[1,2,4]oxadiazolo[3,4-c]-thieno[2,3-e][1,4]diazepin-1-one;
(23) 8-ethyl-6-m-trifluoromethylphenyl-1H,4H-[1,2,4]oxadiazolo-[3,4-c]thieno[2,3-e][1,4]diazepin-1-one;
(24) 6-phenyl-7,8,9,10-tetrahydro-1H,4H-[1,2,4]oxadiazolo-[3,4-c][1]benzothieno[2,3-e][1,4]diazepin-1-one, melting at 149°–150°C.

While the invention has been described in detail and in terms of specific embodiments thereof, it will be apparent that various changes and modifications can be made therein without departing from the spirit and scope thereof.

What is claimed is:

1. The compound:
6-o-chlorophenyl-8-ethyl-4H-imidazo[2,1-c]thieno[2,3-e][1,4]-diazepine.

2. The compound:
6-o-bromophenyl-8-ethyl-4H-imidazo[2,1-c]thieno[2,3-e][1,4]-diazepine.

3. The compound:
8-ethyl-6-o-fluorophenyl-4H-imidazo[2,1-c]thieno[2,3-e][1,4]-diazepine.

* * * * *